Patented Mar. 12, 1946

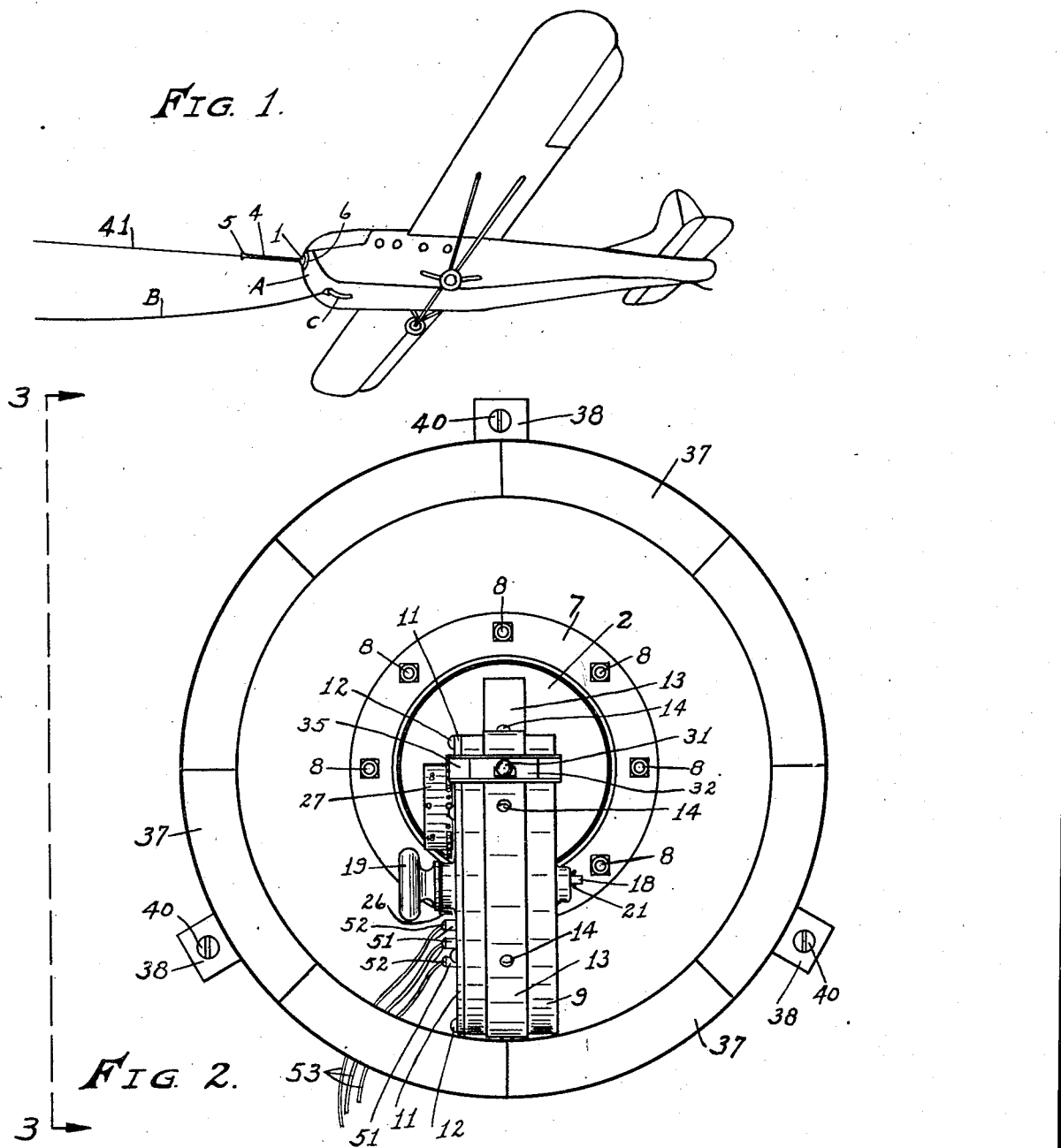

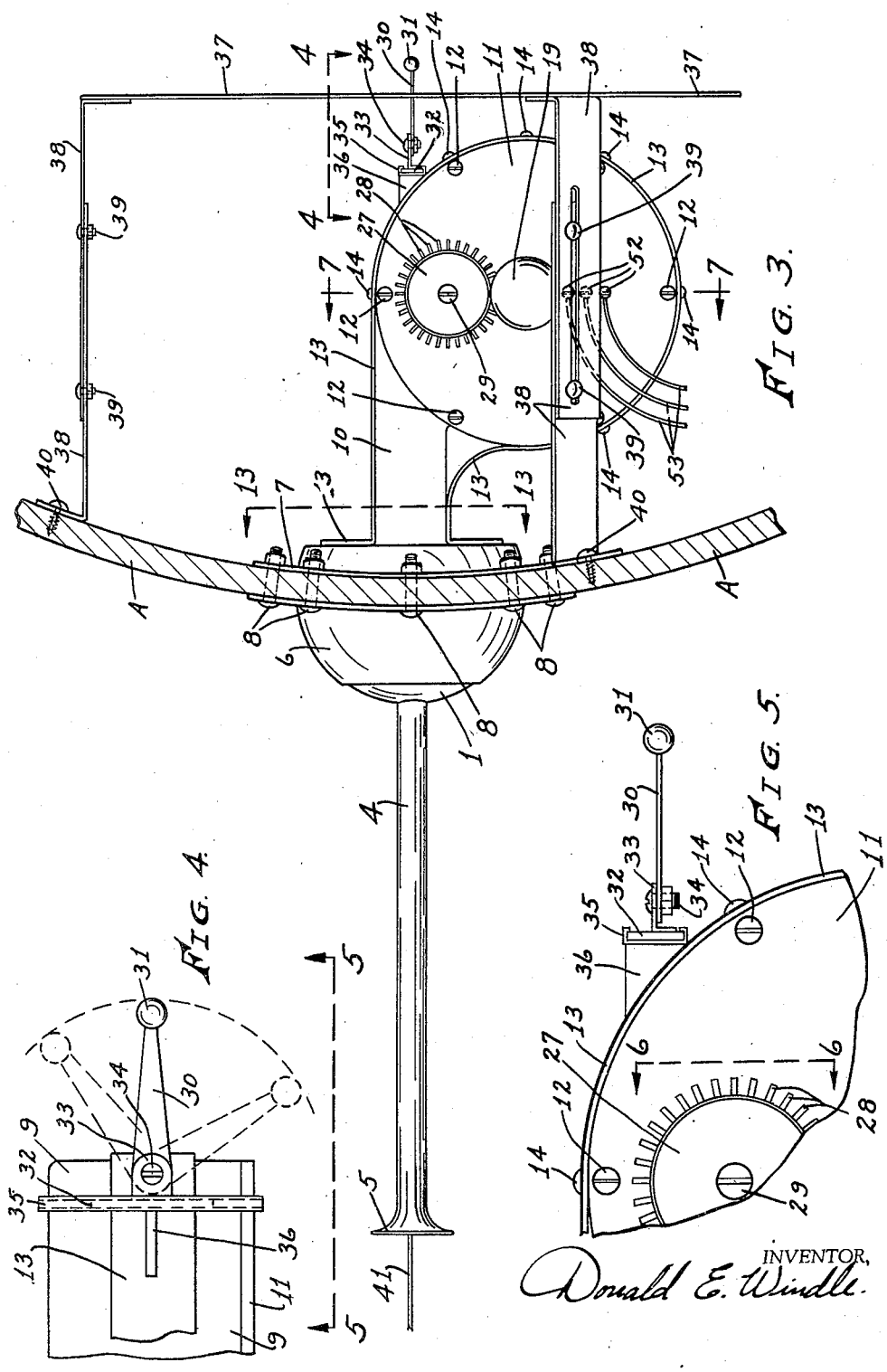

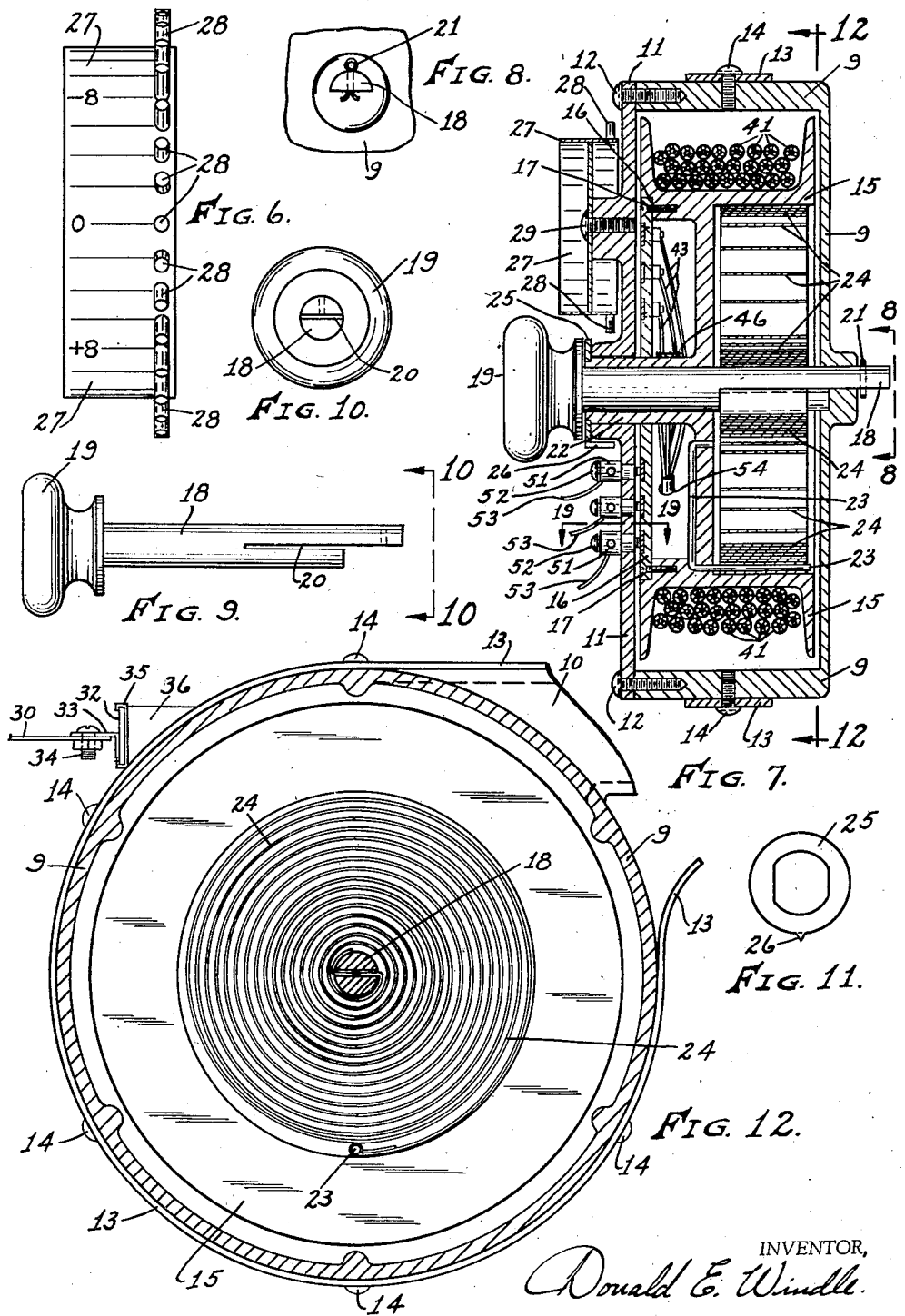

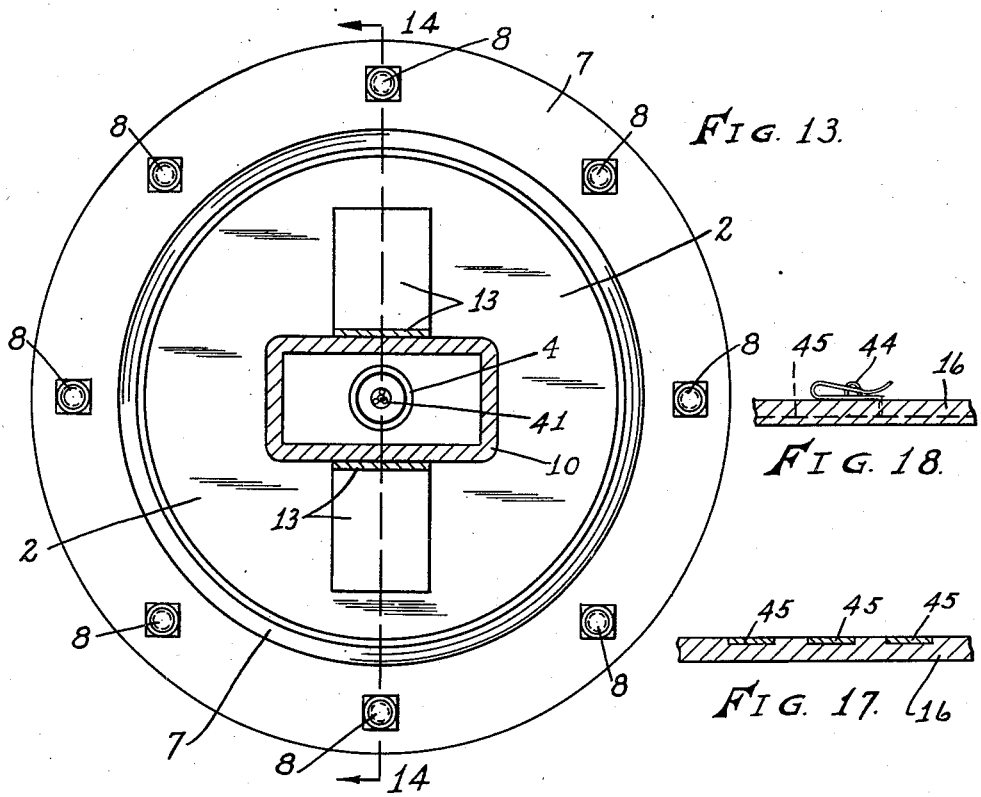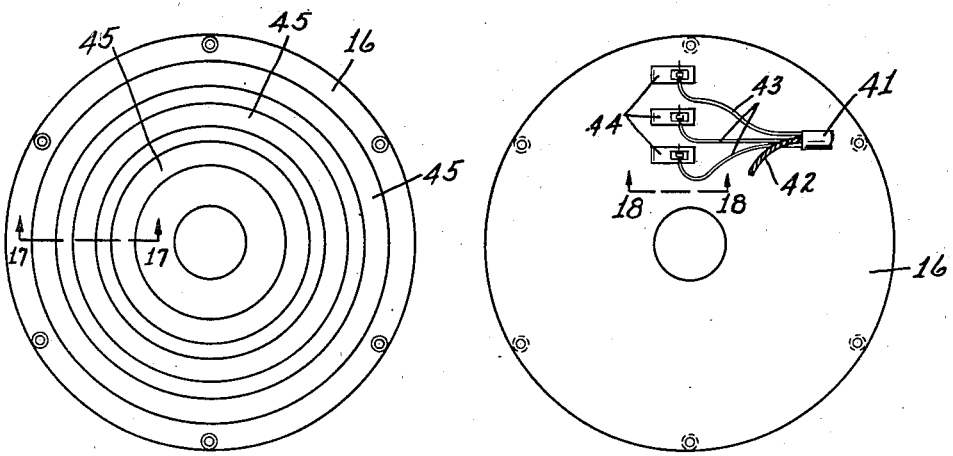

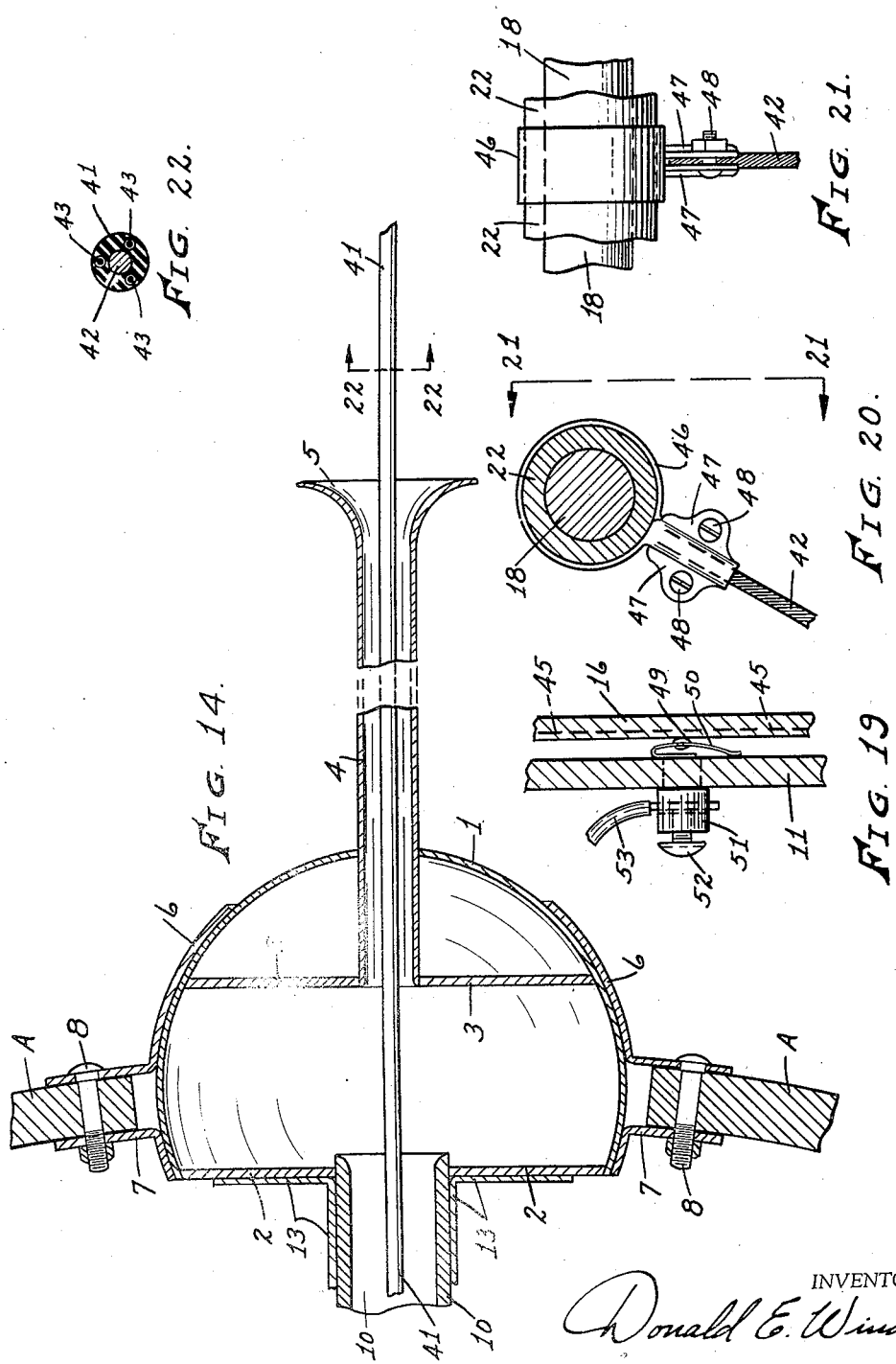

2,396,453

UNITED STATES PATENT OFFICE 2,396,453

GLIDER LOCATION INDICATOR

Donald E. Windle, Richmond, Ind.

Application May 6, 1943, Serial No. 485,943

10 Claims. (Cl. 33—1)

This invention relates to an indicator device primarily intended to form an auxiliary part of gliders, and more particularly with gliders used for the purpose of carrying cargo. I am aware that experiments have been made with various other devices intended for the purpose, but the same have been only partially successful.

Gliders, at the present time, can be flown successfully behind tow planes only when visibility is not impaired by darkness, fog, or other well-known and obvious reasons. The gliders, however, cannot be flown with any degree of success if visibility is impaired by darkness or fog, and therefore are, at the present time, impractical for the lack of a suitable location indicating device.

The use of gliders open a new field of rapid transportation means for cargo and for the carrying of armed troops and, if equipped with a dependable location indicator device, can be successfully flown at all times regardless of visibility. When a plurality of gliders are being towed by a single tow plane, it is essential that a location indicator be used in each of the gliders to indicate the relative location of the gliders with relation to the tow plane in order to maintain each of the gliders in its respective location to prevent collisions thereof with one another, or with the tow plane, as in some cases a glider is inclined to overfly its own tow plane.

The principal object of the invention is the provision of means located within and forming a part of a glider to indicate to the pilot thereof the relative location of his particular glider with relation to the respective tow plane.

A second object of the invention is the provision of a device located within a glider and with means extending therefrom to a tow plane and with dials and indicators indicating drifting movements of the glider with relation to the tow plane whether the movements are in a vertical direction, a horizontal direction, or any positions between vertical and horizontal, or whether the glider movement is toward or away from the tow plane.

A third object of the invention is the provision of a device enabling glider pilots to maintain their respective positions behind their respective tow planes in darkness or in inclement weather especially when visibility is impaired.

A fourth object of the invention is the provision of a device providing means whereby a plurality of gliders may be towed by a single tow plane with each of the glider pilots being able to instantly determine the relative location of his glider with relation to the tow plane and thereby avoid collisions with other gliders attached to the same tow plane and to prevent entanglement of the glider with the tow ropes of other gliders.

A fifth object of the invention is the provision of a location indicating device having a cable extending from a glider to its respective tow plane with telephonic communication wires being formed into the cable and forming a part thereof and providing a means whereby the glider pilots and the tow plane pilots may converse with each other while in flight.

Another object of the invention is the provision of a glider location indicating device which is readily adaptable to gliders, which is simple of construction, easy of installation, economical to manufacture, and which is easy of calibration.

Other objects and advantages of the invention will suggest themselves in the course of the following description, and that which is new will be pointed out in the appended claims.

The most satisfactory means of carrying out the principles of the invention in a practical and efficient manner is shown in the accompanying five sheets of drawings, in which:

Figure 1 is a pictorial illustration of a glider in flight with my location indicator device embodied therein.

Figure 2 is a detail elevation of the indicating device as viewed from the glider pilot's position.

Figure 3 is a detail left side elevation of the device taken from line 3—3 of Figure 2.

Figure 4 is a partial plan view of the device showing the indicating arm, and showing by dotted lines, the arm as being movable from its pivot point to different positions, as taken from line 4—4 of Figure 3.

Figure 5 is a detail side elevation of the indicating arm, taken from line 5—5 of Figure 4.

Figure 6 is a detail view of the distance indictor dial which shows the travel of the glider away from and toward the tow plane.

Figure 7 is a detail central vertical section through the device as taken on line 7—7 of Figure 3.

Figure 8 is an end elevation of the central shaft taken from line 8—8 of Figure 7.

Figure 9 is a detail elevation of the central shaft.

Figure 10 is a detail end elevation of the central shaft taken from line 10—10 of Figure 9.

Figure 11 is a detail elevation of the distance indicator dial actuator.

Figure 12 is a detail vertical section through the reel housing taken on line 12—12 of Figure 7 and showing the arrangement of the spiral spring provided for maintaining tension on the cable extending from the reel of the device to the tow plane.

Figure 13 is a detail vertical section taken on line 13—13 of Figure 3 and showing the rear side of the ball and socket members.

Figure 14 is a detail vertical and longitudinal section through the ball and socket members taken on line 14—14 of Figure 13.

Figure 15 is a detail elevation of the outer side of the reel plate carrying the communication contactor rings.

Figure 16 is a detail elevation of the inner side of the reel plate and showing means for securing the communication conductors thereto.

Figures 17 and 18 are detail sections through the reel plate taken on lines 17—17 and 18—18 of Figures 15 and 16 respectively.

Figure 19 is a detail section taken on line 19—19 of Figure 7 showing one of the binding posts for communication wires.

Figure 20 is a detail section through the central shaft and reel hub and showing the clamping members for adjustably clamping the reel end of the tension cable.

Figure 21 is a side elevation of the adjustable clamping member, taken from line 21—21 of Figure 20.

Figure 22 is an enlarged detail section through the cable member taken on line 22—22 of Figure 14.

Like characters designate like parts throughout the several views.

In order that the construction and the advantages of the invention may be more fully understood and appreciated, I will now take up a detailed description thereof in which the same will be more fully described.

Referring now to the drawings in detail, letter A designates the nose or front portion of the glider fuselage through which the indicator device is removably secured. B designates the tow rope which extends from the fastening C on the glider to the tow plane.

The device is adapted to indicate upward, downward, and lateral positions of the glider with relation to its tow plane and I have therefore provided a partial sphere or ball member 1 with a plate 2 closing the rear end thereof and with an intermediate reinforcing plate 3 being rigidly secured within the member 1.

Extending forwardly through the member 1 is a tube 4 which has a flared or bell-shaped forward end 5. The rear end of tube 4 is rigidly secured through the intermediate plate 3 as shown in Figure 14. A forward retainer ring 6 is positioned circumferentially around the forward portion of the member 1 to retain the same in relation to the glider nose A. A rear ring 7 is positioned circumferentially about the spherical portion of member 1 which projects into the glider through the nose portion A. Rings 6 and 7 are removably secured together through the nose portion A by means of bolts 8, as more clearly shown in Figure 14. It is obvious that member 1 will circumduct within the ring members 6 and 7, with the movement of member 1 within the ring members 6 and 7 being limited only by contact of tube 4 against the forward edge of the ring member 6.

A reel housing 9 is provided within the glider and is located rearwardly of the ball and socket members 1, 6, and 7. A forwardly-extending conduit 10 is formed on the reel housing 9 with the forward end thereof being extended through the plate 2, the same being more clearly shown in Figures 3 and 14. A reel housing cover plate 11 is secured to the open side of the reel housing by means of threaded screws 12, as indicated in Figures 2, 3, 5, and 7. A supporting strap 13 is provided around the periphery of the reel housing and is rigidly secured thereto by means of threaded screws 14, and with the end portions of the strap 13 being rigidly secured to the rear plate 2 by any well-known means.

A reel 15 is revolvably mounted on the central shaft 18 and is provided with a side plate 16 removably secured to the reel 15 by means of threaded screws 17.

Referring to Figures 8, 9, and 10, it will be noted that shaft 18 has a knob portion 19 formed on one end thereof. The opposite end of the shaft 18 has a slot formed therein for securing the inner end portion of the spiral tension spring 24, the purpose of which will be hereinafter more fully set forth. One part of the slotted portion is comparatively longer than the second portion. An aperture is formed through the longer of the slotted portions for reception of the pin or cotter 21, the same being used to prevent slippage of the shaft 18 endwise through the reel housing 9 and cover plate 11.

The reel 15 is provided with a hub member 22, the same being journalled on shaft 18 with the end portion of the hub extending outwardly through the reel housing cover plate 11 as shown in Figure 7. An outer spring fastening member 23 is provided with the same being secured through the web of reel 15 as shown in Figure 7.

The spiral tension spring 24 has the inner end thereof extending through the slot 20 of the central shaft 18 and with a loop being formed at the outer end of the spring as shown in Figure 12, with the loop encircling the projecting portion of the outer spring fastening member 23.

A washer member 25, having an indicator actuator finger 26 formed thereon, is fitted on the outwardly projecting end of the reel hub 22 and is rotated therewith. A distance indicator dial 27 is rotatably secured to the outer side of the reel housing cover plate 11 by means of the screw 29. Outwardly extending engaging pins 28 are secured through the periphery of the distance indicator dial 27, with the pins 28 being successively engageable by the finger 26 in its rotations with the reel hub 22. The distance indicator dial 27 is preferably marked with graduations about its periphery, with the graduations being provided with plus and minus numerals as shown in Figure 6 to indicate the variations in distance between the glider and its tow plane, the lessening of the distance being indicated by the plus numerals indicating that the glider has gained distance with relation to its tow plane, and with the minus numerals indicating that the distance between the glider and the tow plane has become greater due to the loss of speed of the glider with relation to the speed of the tow plane. The zero (0) on the indicator dial indicates the normal distance between the tow plane and the glider. The dial may be manually set by the glider pilot before the takeoff.

In order that the glider pilot may be constantly aware of his vertical as well as lateral location with relation to the tow plane, I have provided an indicator arm 30 having an indicator ball 31 formed on the rearwardly projecting end thereof. The opposite end of the indicator arm is pivotly secured to a slide bar 32 through the arm bracket 33 and with the arm 30 being adjustably secured to the bracket 33 by means of the bolt 34. The slide bar 32 is located in the guide 35 which is secured to the strap 13 through the rib member 36. It will be noted by reference to Figure 4 that the indicator arm may be adjusted to different positions to compensate for the predetermined position in which the glider is to be flown with relation to the tow plane. Further lateral adjustment of the position of the indicator ball may be obtained by moving the slide bar endwise in the guide 35 to the desired position.

A vertical and lateral indicator dial 37 is adjustably supported within the nose A on slotted brackets 38 with bolts 39 providing means of adjusting the position of the dial 37 with relation to the reel housing 9 and the indicator ball 31. The adjustable brackets 38 are secured to the nose A by means of screws 40.

In order to provide relative movement to the indicating device, I have provided a cable 41 as shown in Figure 22 having a tension core member 42 centrally positioned therein, with the forward end of the core member 42 being fixedly secured to a member (not shown) in the interior of the tow plane and with the glider end thereof being wound on the reel 15 with the reel end of the core 42 being releasably secured within the reel. The reel end of the core 42 is held between the clamping ends 47 of the hub-encircling strap 46 by means of the bolts 48, the purpose of which will be more specifically set forth hereinafter.

In order to provide communication between the glider pilot and the tow plane pilot, I have provided conductors 43 through the cable 41 and forming a part thereof as shown in Figure 22. The tow plane end of the conductors (not shown) are preferably secured to terminal posts on a panel board to which communication wires may be extended to the tow plane pilot's position. The glider end of the conductors are preferably secured, within the reel, to spring clips 44 as shown in Figures 7 and 16. Each of the spring clips are extended through the reel plate 16 and are electrically connected to conductor rings 45 which are embedded in the plate 16 as indicated more clearly in Figures 17 and 18. Contactor points 49, secured to the conductor springs 50, bear against respective conductor rings as shown in Figure 19. The conductor springs 50 extend through the reel housing side plate 11 and are electrically connected to binding posts 51. Communication wires 53 are secured in the binding posts 51 by means of screws 52, as shown in Figure 19. The communication wires 53 are connected to suitable communication apparatus (not shown) for the use of the glider pilot.

In the operation of the device, with the same being assembled as shown in the various figures, and with the cable 41 being extended from the glider to the tow plane, the indicator arm 30 and the indicator dial 27 are set to the desired positions as determined by the relative position to be maintained by the glider with relation to the tow plane when in flight. The spiral tension spring 24 maintains tension on the cable 41 through the tension core 42. Variations in position vertically and laterally of the glider with relation to the tow plane are indicated by movement of the indicator ball with relation to the vertical and lateral indicator dial 37 with the pivotal movement of the ball 1 between the rings 6 and 7. Variations in the distance between the glider and the tow plane are indicated by movement of the distance indicator dial by means of the rotation of the indicator actuator finger by the reel hub 22. As the distance between the glider and the tow plane varies, the cable 41 is wound onto or unwound from the reel, with tension of the cable 41 being maintained by means of the spiral tension spring 24.

When the glider pilot releases the tow rope from the glider in flight, the full pull of the glider is taken by cable 41, the spiral spring has insufficient tension to prevent the cable 41 from unwinding from the reel. When all of the cable is unwound from the reel, the tension on the core 42 causes the same to be pulled from between the adjustable clamps 47. As soon as the core 42 is released from the clamps 47, the tension on the cable slips the conductors 43 from the spring fasteners 44 and the end of the cable is pulled through the tube 4 by the tow plane, leaving the glider entirely free of both the tow rope B and the cable 41. The tow rope and the cable may be drawn into the tow plane by suitable means.

When it is necessary to rewind the cable on the reel, the cotter is removed from the shaft 18 allowing the shaft to be withdrawn by means of the knob 19. The cover plate 11 is removed by withdrawing screws 12 and allowing the reel 15 to be withdrawn from its housing 9, after which the reel side plate 16 is removed from the reel. The end of cable 41 is then threaded through the tube 4, and into the reel housing through the conduit 10. The end of cable 41 is then drawn through aperture 54 of the reel after which the end of tension core 42 can be secured between the clamping ends 47 by means of bolts 48. The ends of conductors 43 are then secured in their respective spring fasteners 44, after which the reel side plate 16 is replaced. Shaft 18 is inserted through the reel housing cover plate 11 and through the hub of the reel. The inner end of tension spring 24 is inserted in slot 20 of the shaft 18 after which the spring may be tensioned by rotating the shaft in a clockwise direction. When the proper tension is assumed by the spring 24 and the proper length of cable 41 has been wound on the reel, the end of shaft 18 is extended through the reel housing. The form of the end of shaft 18 prevents the shaft from being rotated by action of the spring 24. The reel housing cover plate 11 is then secured to the reel housing by means of screws 12.

Should it be desirable at any time to release the tension of spring 24 from the reel, the same can be accomplished by removing cotter 21, and withdrawing shaft 18 by means of knob 19.

The device may be constructed of any suitable materials such as metal or plastics or combinations of materials. It is, however, desirable that the reel side plate 16 and the reel housing cover plate 11 be made of non-electrical conducting material to simplify the use of connections for the conductors and the conductor rings 45.

It is to be understood that I am not to be limited to the exact form and position of the parts herein shown and described, but that minor changes may be made in the several parts insofar as the changes may fall within the scope of the appended claims.

Having now fully shown and described the invention, what I claim and desire to secure by Letters Patent of the United States is:

1. An indicating device located within the nose of a glider, an indicator dial adjustably positioned within the glider, an indicator ball carried by the device and movable therewith, and means extending from the indicating device to a tow plane with said means moving the indicator and the indicator ball carried thereby, and with the relation of the indicator ball with respect to the indicator dial indicating the relative location of the glider with relation to its tow plane.

2. A glider location indicator pivotally positioned in the nose of a glider and carried thereby and having a tubular member extending forwardly therefrom, a cable extending from the indicator and through the tubular member to a tow plane, and with the movement of the cable being transferred to the indicator through the tubular member.

3. A glider location indicator device pivotally secured in the nose of a glider and having an indicating ball extending therefrom, a dial adjustably secured within the glider and in concentric relation to the normal position of said indicating ball, a tensioned reel mounted within the indicator device, a cable wound on said reel and adapted to unwind therefrom, and with a revolvable dial operated by said reel being mounted on the side of said indicator device and showing the amount of cable being extended from the reel.

4. A glider location indicator device pivotally secured in the nose of a glider with an indicator ball being adjustably secured thereto and extending therefrom, a dial adjustably secured within the glider and positioned concentrically with relation to the indicator ball, a tube extending forwardly of the indicator device and movable therewith, a tensioned reel mounted within the indicator device, a cable wound on said reel and extending outwardly through said tube, and a revolvable dial mounted on the side of the indicator device and operable by means of the movement of said reel with the revolvable dial indicating the extension and retraction of said cable on said reel.

5. In combination with a glider adapted to be towed behind a powered airplane, an indicating device secured through the forward end of the glider and operable by means of a cable extending therefrom to the tow plane, said device being adapted to register the direction of drift of the glider with relation to the position of the tow plane, means incorporated in the indicating device registering the relativity of the distance between the glider and the tow plane, and means incorporated within the indicating device automatically releasing the cable from the indicating device when the distance between the glider and the tow plane exceeds the length of cable.

6. In combination with a glider, an indicating device having a forwardly extending tube projecting therefrom, a tensioned cable extending through the forwardly extending tube to a tow plane, means located within the indicating device yieldably tensioning said cable, and with swingable movement of the forwardly extending tube being registered on a dial supported within the glider.

7. In a glider, an indicating device having a dial indicating the direction of drift of the glider with relation to its tow plane, a second dial indicating the relativity of distance between the glider and its tow plane, and with the device being mounted in a pivotal joint located in the nose of the glider, and with a cable extending from the indicating device through the pivotal joint and to the tow plane with the cable actuating the device through the pivotal joint.

8. In combination with a glider, an indicating device pivotally mounted through the nose of the glider, a tensioned cable extending from the indicating device to a tow plane, and with the drift of the glider with relation to the tow plane actuating the indicating device to indicate the direction of drift of the glider with relation to the tow plane, and means located within the indicating device tensioning the cable.

9. An indicating device pivotally positioned in the nose of a glider, a cable extending from the indicating device to a tow plane with the drift of the glider with relation to the tow plane actuating the indicating device through the pivotal joint, a dial supported within the glider, an indicating ball carried by the indicating device and showing the direction of drift of the glider with relation to the tow plane with the direction of drift being indicated by the relativity of the indicating ball with relation to the dial.

10. A glider location indicator device pivotally positioned within the nose of a glider and having a portion thereof extending forwardly therefrom, a tensioned reel located within the indicator device and forming a part thereof, a cable secured to said tensioned reel and extending through the forwardly extending portion with the extended end of the cable being secured to a tow plane, a distance registering dial located adjacent the reel and operable by the action thereof with said distance registering dial indicating the relative distance between the glider and its tow plane, a second dial adjustably secured within the glider with the same being adapted to indicate vertical and lateral variations of the glider with relation to the position of the tow plane through the pivotal movement of the indicator device with relation to the glider.

DONALD E. WINDLE.